(12) United States Patent
Petty et al.

(10) Patent No.: US 11,995,129 B2
(45) Date of Patent: May 28, 2024

(54) SYSTEM AND METHOD FOR ANNOTATING WEBSITE CONTENT

(71) Applicant: RADICAL HQ LIMITED, London (GB)

(72) Inventors: Thomas Petty, London (GB); Andrei Gheorghe, London (GB); Katricia Olearczyk-Reid, London (GB); Sven Over, London (GB); Henry Davies, London (GB); Jackson Gabbard, London (GB); Nimrod Priell, London (GB); Abigail Barsky, Atlanta, GA (US)

(73) Assignee: RADICAL HQ LIMITED, London (GB)

( * ) Notice: Subject to any disclaimer, the term of this patent is extended or adjusted under 35 U.S.C. 154(b) by 0 days.

(21) Appl. No.: 17/326,038

(22) Filed: May 20, 2021

(65) Prior Publication Data

US 2022/0261439 A1   Aug. 18, 2022

Related U.S. Application Data

(60) Provisional application No. 63/149,825, filed on Feb. 16, 2021.

(51) Int. Cl.
*G06F 16/00* (2019.01)
*G06F 16/2458* (2019.01)
*G06F 16/908* (2019.01)
*G06F 16/958* (2019.01)

(52) U.S. Cl.
CPC ........ *G06F 16/908* (2019.01); *G06F 16/2468* (2019.01); *G06F 16/958* (2019.01)

(58) Field of Classification Search
CPC ... G06F 16/908; G06F 16/2468; G06F 16/958
See application file for complete search history.

(56) References Cited

U.S. PATENT DOCUMENTS

| | | | | |
|---|---|---|---|---|
| 7,370,269 | B1 * | 5/2008 | Prabhu | G06F 16/954 715/201 |
| 7,373,590 | B2 * | 5/2008 | Woolf | G06Q 10/10 715/268 |
| 8,527,591 | B2 | 9/2013 | Pirnazar | |
| 9,171,087 | B2 | 10/2015 | Pirnazar | |
| 9,185,145 | B2 | 11/2015 | Pirnazar | |
| 9,483,448 | B2 | 11/2016 | Pirnazar | |
| 9,489,353 | B2 | 11/2016 | Pirnazar | |
| 2002/0035697 | A1 * | 3/2002 | McCurdy | G06F 16/93 705/51 |

(Continued)

*Primary Examiner* — Syed H Hasan
(74) *Attorney, Agent, or Firm* — Lewis Roca Rothgerber Christie LLP (57) ABSTRACT

A non-transitory computer-readable storage medium having software instructions stored therein, which, when executed by a processor, cause the processor to receive, from a first electronic device, an annotation of content on a webpage or a software product displayed on a display of the first electronic device, associate the annotation with metadata of the content on the webpage or the software product, and transmit a signal configured to display, on a display of a second electronic device, the annotation and the content of the webpage or the software product based on the metadata associated between the annotation and the content of the webpage or the software product.

16 Claims, 3 Drawing Sheets

(56) References Cited

U.S. PATENT DOCUMENTS

| | | | | |
|---|---|---|---|---|
| 2003/0028561 A1* | 2/2003 | Gounares | ............... | G06F 40/154 |
| | | | | 715/234 |
| 2005/0044145 A1* | 2/2005 | Quinn | ................. | H04L 9/40 |
| | | | | 709/205 |
| 2007/0124373 A1* | 5/2007 | Chatterjee | .............. | G06Q 10/10 |
| | | | | 709/204 |
| 2008/0301228 A1* | 12/2008 | Flavin | .................. | G06Q 10/10 |
| | | | | 709/204 |
| 2009/0260060 A1* | 10/2009 | Smith | ................. | H04L 63/105 |
| | | | | 715/753 |
| 2010/0063971 A1* | 3/2010 | Cragun | ............... | G06F 16/907 |
| | | | | 707/783 |
| 2012/0089659 A1* | 4/2012 | Halevi | ............... | G06F 16/9577 |
| | | | | 709/201 |
| 2014/0068415 A1* | 3/2014 | Halevi | ................ | G06F 40/143 |
| | | | | 715/234 |
| 2014/0173393 A1* | 6/2014 | Roy | ................... | G06F 40/117 |
| | | | | 715/201 |
| 2016/0132578 A1* | 5/2016 | Allen | .................. | H04L 45/22 |
| | | | | 709/203 |
| 2017/0277669 A1* | 9/2017 | Sekharan | ............. | G06F 40/169 |

* cited by examiner

SYSTEM AND METHOD FOR ANNOTATING WEBSITE CONTENT

CROSS-REFERENCE TO RELATED APPLICATION(S)

The present application claims priority to and the benefit of U.S. Application No. 63/149,825, filed Feb. 16, 2021, the entire content of which is incorporated herein by reference. The present application is also related to co-pending U.S. application Ser. No. 17/325,662, filed May 20, 2021, the entire content of which is incorporated herein by reference, and which is not admitted to be prior art with respect to the present application by its mention in the cross-reference section.

BACKGROUND

1. Field

The present disclosure relates generally to systems and methods of annotating content published on websites.

2. Description of Related Art

Content published online is generally accessed by users issuing requests to a remote server that stores the requested content and controls access to that content. These requests may, in some instances, be routed through multiple server, or nodes, within a network before reaching the remote server. Users may generate requests, and interact with the requested content, via a user interface provided by a web browser. Content displayed within a user's web browser is typically in the form of a webpage, i.e., a display window shown to the user that depicts the content of the webpage and that can receive inputs from the user.

Webpages, where content is published online, are typically HTML documents that contain components that are defined in the document's Document Object Model (DOM) as elements. The DOM is a programming interface that allows other programs to interact with the content within the HTML document. For example, the display of the elements within the DOM may be controlled via a program coded in Cascading Style Sheets (CSS). As such, the display of content to a user is generally based on showing the content as defined within the DOM as modified by other programs that may be coded in other languages. This allows, for example, the display of a news article to adjust to the display size that a user is viewing the webpage on.

A person viewing content published online may wish to provide themselves or others with annotations regarding the published content for later review. However, because the display of published content is not static, as it may be changed either by modification to the content as defined in the DOM or otherwise have the display of the content changed by another program, leaving annotations for published content can be difficult and/or may result in inaccuracies. Moreover, when the display of annotated content has been dramatically changed or if the content is no longer being displayed, a person reviewing the annotations may be unable to view the annotations within the intended context.

SUMMARY

The present disclosure relates to various embodiments of a computer-implemented method of annotating a webpage or a software product. In one embodiment, the method includes receiving, from a first electronic device, an annotation of content on the webpage or the software product displayed on a display of the first electronic device, associating the annotation with metadata of the content on the webpage or the software product, and transmitting a signal configured to display, on a display of a second electronic device, the annotation and the content of the webpage based on the metadata associated between the annotation and the content of the webpage or the software product.

The method may also include determining changes to the content by performing a search utilizing a string matching algorithm, a fuzzy search algorithm, and/or an image matching algorithm.

The method may also include transmitting an alert to the second electronic device in response to the search returning no results.

The method may also include transmitting, to the second electronic device, a screenshot of the annotation and the content in response to the search returning no results.

The content may be text, graphical elements, or combinations thereof, and the annotation may be highlighting, text, graphical elements, or combinations thereof.

The task of associating the annotation with the metadata of the content on the webpage or the software product may include mapping the content to at least one associated Document Object Model (DOM) element in an internal representation of the webpage or the software product.

The task of associating the annotation with the metadata of the content on the webpage or the software product may include identifying a locus of the content in a Document Object Model (DOM) tree in an internal representation of the webpage or the software product.

The task of associating the annotation with the metadata of the content on the webpage or the software product may include determining a position of the content relative to a position of at least one fixed element on the webpage or the software product and along a projected horizontal line and/or a projected vertical line from the content.

The position of the content may include a series of relative distances expressed in percentages of a display area of the display and/or pixel widths and heights.

The method may also include receiving, from the first electronic device, a selection of the content on the webpage or the software product.

The present disclosure also relates to various embodiments of a non-transitory computer-readable storage medium. In one embodiment, the non-transitory computer-readable storage medium has software instructions stored therein, which, when executed by a processor, cause the processor to receive, from a first electronic device, an annotation of content on a webpage or a software product displayed on a display of the first electronic device, associate the annotation with metadata of the content on the webpage or the software product, and transmit a signal configured to display, on a display of a second electronic device, the annotation and the content of the webpage or the software product based on the metadata associated between the annotation and the content of the webpage or the software product.

The instructions, when executed by the processor, may further cause the processor to determine changes to the content by performing a search utilizing a string matching algorithm, a fuzzy search algorithm, and/or an image matching algorithm.

The instructions, when executed by the processor, may further cause the processor to transmit an alert to the second electronic device in response to the search returning no results.

The instructions, when executed by the processor, may further cause the processor to transmit, to the second electronic device, a screenshot of the annotation and the content in response to the search returning no results.

The content may be text, graphical elements, or combinations thereof, and the annotation may be highlighting, text, graphical elements, or combinations thereof.

The instructions, when executed by the processor, may further cause the processor to map the content to at least one associated Document Object Model (DOM) element in an internal representation of the webpage or the software product to associate the annotation with the metadata of the content on the webpage or the software product.

The instructions, when executed by the processor, may further cause the processor to identify a locus of the content in a Document Object Model (DOM) tree in an internal representation of the webpage or the software product to associate the annotation with the metadata of the content on the webpage or the software product.

The instructions, when executed by the processor, may further cause the processor to determine a position of the content relative to a position of at least one fixed element on the webpage and along a projected horizontal line and/or a projected vertical line from the content.

The position of the content may include a series of relative distances expressed in percentages of a display area of the display and/or pixel widths and heights.

The instructions, when executed by the processor, may further cause the processor to receive, from the first electronic device, a selection of the content on the webpage or the software product.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable system or method of annotating website content.

BRIEF DESCRIPTION OF THE DRAWINGS

The accompanying drawings, together with the specification, illustrate exemplary embodiments of the present disclosure, and, together with the description, serve to explain the principles of the present disclosure.

DETAILED DESCRIPTION

The present disclosure relates to various systems and computer-implemented methods for annotating content published content online utilizing an interface provided through a user's web browser, and for sharing the annotated content among other users of a network. As described in greater detail below, the systems and methods of the present disclosure may be, in some embodiments, implemented on one or more electronic devices linked via a network to one or more servers that facilitate the creation, storage, and reproduction of annotations provided by the one or more users of content published online such that the annotations can be provided to the one or more users across the one or more electronic devices connected to the network. Annotating published content online can be a valuable productivity-enhancing technique for those conducting research, working collaboratively with colleagues, or otherwise working with web-based content. However, webpages are frequently updated or modified, meaning that content, and its display within a webpage, may not remain static between instances when a user or different users visit the webpage. The systems and methods of the present disclosure are configured to reproduce the display of annotations as originally created when, for example, the webpage or software page is rendered differently, such as when the same user or a different user views the webpage or the software product on a different electronic device with a different resolution, when the height and/or width of the display window is different (or is adjusted) such that the content renders differently due to, for example, the browser or CSS rendering instructions, and/or when content of the webpage or software product is added, removed, or otherwise modified (e.g., rearranged). In one or more embodiments, the systems and methods of the present disclosure are configured to identify (e.g., utilizing a string matching algorithm, a fuzzy search algorithm, and/or an image matching algorithm) when annotated content has been modified within a page and to reproduce the annotation in a position that takes this modification into account. Furthermore, in one or more embodiments, the systems and methods of the present disclosure are configured to identify when content has been sufficiently repositioned and/or modified such that the annotation(s) cannot be adequately reproduced and to alert the user of such modifications and/or make a captured image (e.g., a screenshot) of the original display of the annotated content available.

Figure 1:
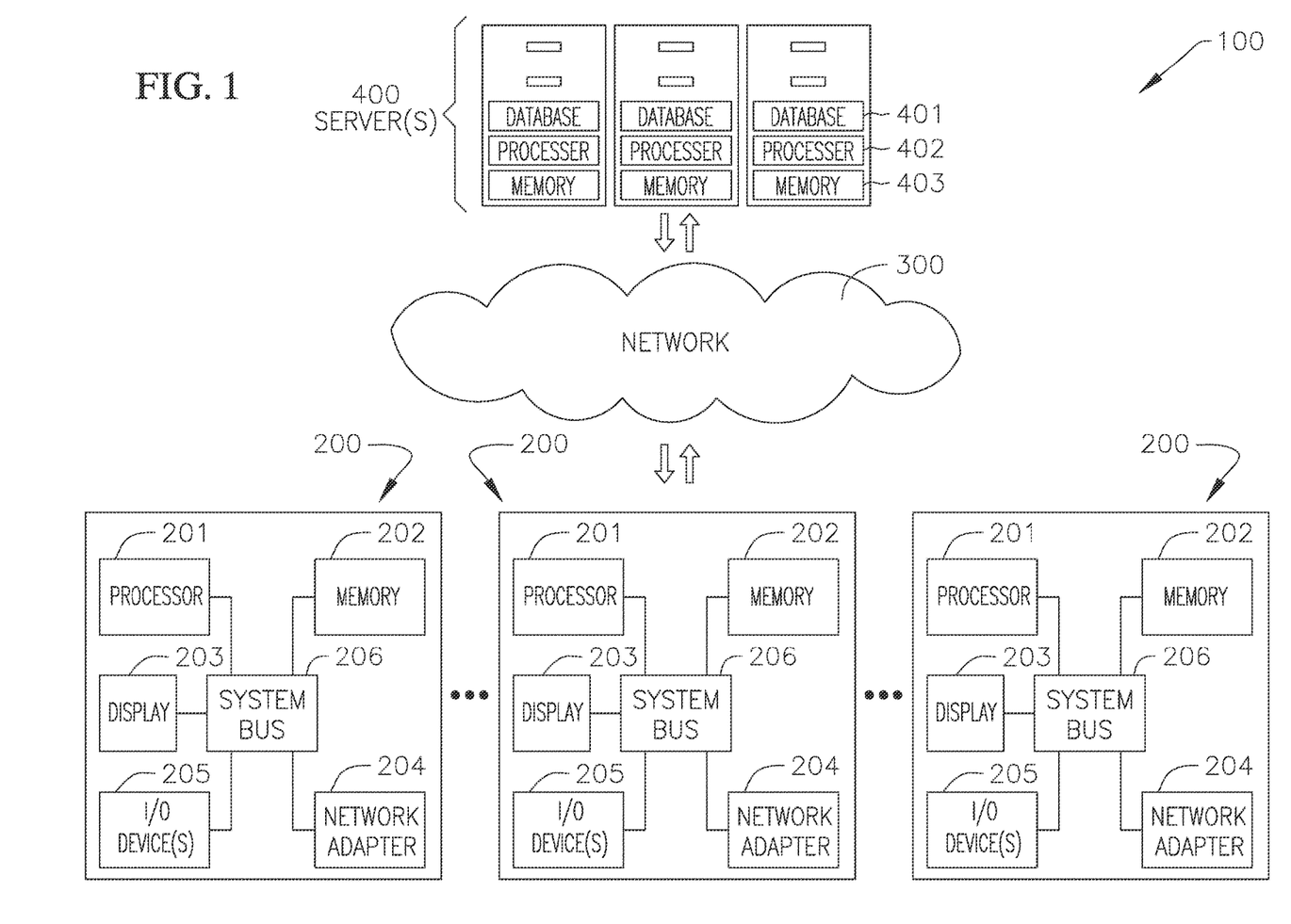
FIG. 1 is a schematic view of a system for annotating a webpage or software product according to one embodiment of the present disclosure.

FIG. 1 is a block diagram of a system 100 according to one embodiment of the present disclosure. In the illustrated embodiment, the system 100 includes a series of electronic devices 200 (e.g., desktop computers, cellular phones, tablet computers, wearable electronic devices, or combinations thereof) connected to each other (i.e., configured to electronically communicate with each other) over a data network 300 (e.g., a local area network or a wide area network) via one or more servers 400. In one or more embodiments, the electronic devices 200 may be operated by individuals (e.g., users, such as office personnel or other employees) who work for the same organization or related organizations (e.g., the electronic devices 200 may be operated by users with similar access to the data network 300 and the one or more servers 400, such as users with similar login credentials or permissions within the system 100). The number of electronic devices 200 connected to each other over the data network 300 via the one or more servers 400 may vary depending on the size of the organization or the sizes of the related organizations. As described in more detail below, the server 400 includes one or more software modules for facilitating and coordinating the sharing of annotations of the content of a webpage or a software product (e.g., software as a product (SaaP) or software as a service (Saas)) between the users of the electronic devices 200.

In one or more embodiments, the one or more servers 400 includes a mass storage device or database 401 such as, for example, a disk drive, drive array, flash memory, magnetic tape, or other suitable mass storage device for storing instructions and information used by the server 400. For example, the database 401 may store personal profile information about the users, interactions between the users, interactions between a user and a software product, business/network data, and/or analysis results (e.g., processed data), amongst other data. In one or more embodiments, the database 401 may store any other relevant information for facilitating interactions between users of the electronic devices 200. Although the database 401 is included in the server 400 as illustrated in FIG. 1, in one or more embodiments, the server 400 may be connected to an external database that is not a part of the server 400, in which case, the database 401 may be used in addition to the external database or be omitted entirely.

The one or more servers 400 further include a processor or central processing unit (CPU) 402, which executes program instructions from memory 403 and interacts with other system components to perform various methods and operations according to one or more embodiments of the present disclosure. The memory 403 is implemented using any suitable memory device, such as a random access memory (RAM), and may additionally operate as a computer-readable storage medium having non-transitory computer readable instructions stored therein that when executed by the processor 402 cause the server 400 to control and manage interactions and facilitate communications between the users using the electronic devices 200 over the data network 300.

In the embodiment illustrated in FIG. 1, each of the electronic devices 200 includes a processor 201, a memory device 202, a display 203 configured to display images, a network adapter 204 configured to communicate with other devices, including the server 400, and one or more input/output (I/O) devices 205 (e.g., a keyboard and a mouse). In the illustrated embodiment, the processor 201, the memory 202, the display 203, the network adapter 204, and the input/output (I/O) device(s) 205 communicate with one another over a system bus 206. In one or more embodiments, the memory 202 may include persistent memory, such as NAND flash memory, for storing instructions.

The term "processor" is used herein to include any combination of hardware, firmware, and software, employed to process data or digital signals. The hardware of a processor may include, for example, application specific integrated circuits (ASICs), general purpose or special purpose central processors (CPUs), digital signal processors (DSPs), graphics processors (GPUs), and programmable logic devices such as field programmable gate arrays (FPGAs). In a processor, as used herein, each function is performed either by hardware configured, i.e., hard-wired, to perform that function, or by more general purpose hardware, such as a CPU, configured to execute instructions stored in a non-transitory storage medium. A processor may be fabricated on a single printed wiring board (PWB) or distributed over several interconnected PWBs. A processor may contain other processors; for example, a processor may include two processors, an FPGA and a CPU, interconnected on a PWB.

As described in more detail below, the memory 403 of the server 400 and/or the memory 202 of the electronic devices 200 store instructions that, when executed by the processor 402, 201, respectively, cause the server 400 and the electronic devices 200 to perform various functions to facilitate collaboration between the users of the electronic devices 200.

In one or more embodiments, the memory 202 of the one or more electronic devices 200 includes instructions that, when executed by the processor 201 of the one or more electronic devices 200, produces a user interface, or graphical user interface (GUI), that may be displayed on the display 203 of the one or more electronic devices 200. The user interface may, in some embodiments, be instantiated as an extension that can be run alongside or in conjunction with other programs being run by the one or more electronic devices 200. Any suitable programming language may be used to construct the user interface, such as, but not limited to, C/C++, Objective C, Swift, Java, Tcl/Tk, Lua, and the like. As a non-limiting example, the user interface could be an extension run alongside a web browser that allows a user to access the user interface while viewing webpages using the web browser. Any suitable web browser may be used within the scope of the present disclosure, including but not limited to, Chrome®, Firefox®, Internet Explorer®, Safari®, and the like. In some embodiments, the user interface may be configured to receive input from a user via the one or more I/O devices 205 of the one or more electronic devices 200 using the GUI.

The instructions included on the memory 202 of the one or more electronic devices 200 may, in one or more embodiments, further contain instructions for operating an Application Programming Interface (API) configured to produce, send, receive, and interpret requests and/or being sent to the one or more servers 400 using the data network 300. The API may be instantiated as a representational state transfer (REST) API, a simple object access protocol (SOAP) API, a XML-RPC or JSON-RPC API, or any other suitable API as would be known to one skilled in the art. The instructions instantiating the API may be programmed in any suitable programming language, including, but not limited to, Java, JavaScript (via Node.js), Python, Haskell, Lisp, and the like.

Figure 2:
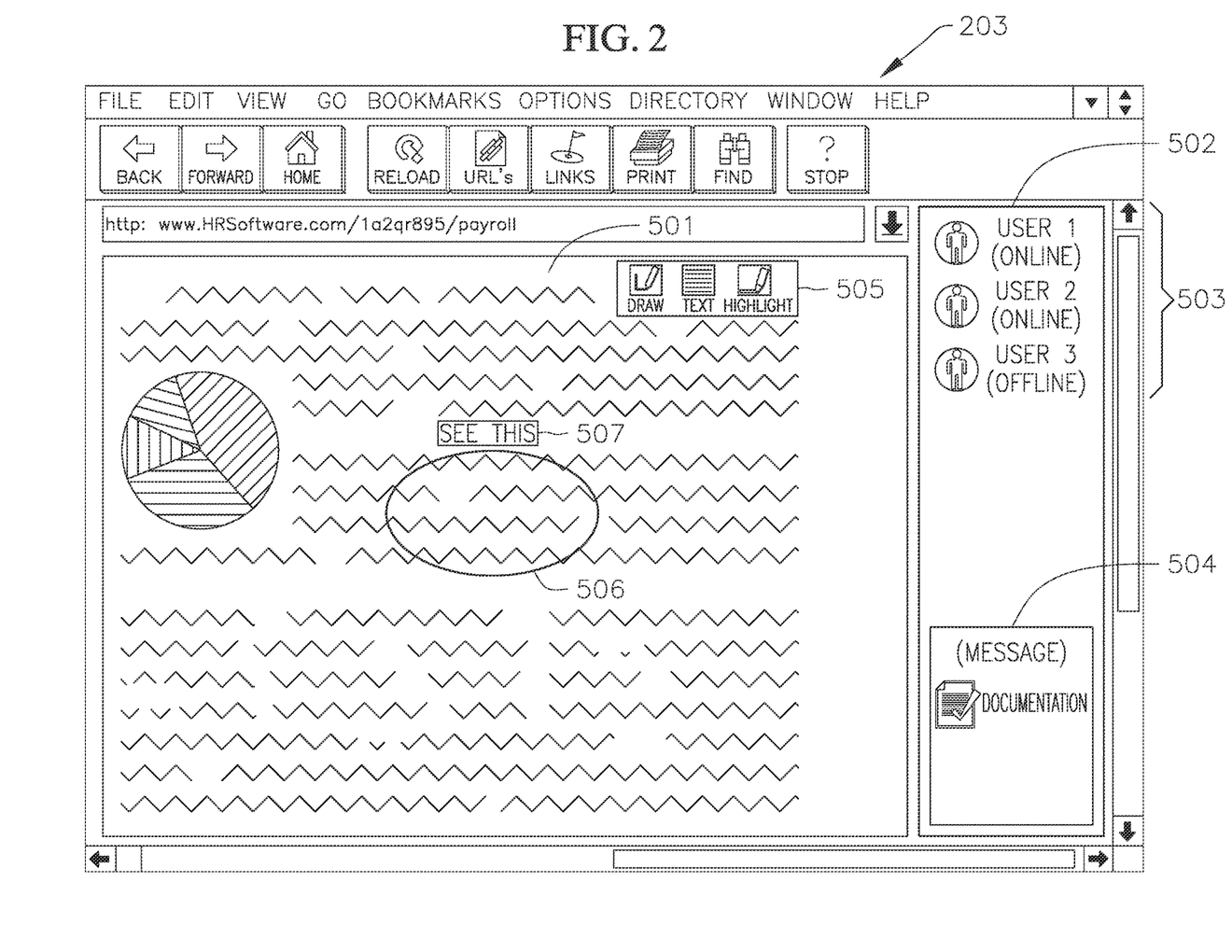
FIG. 2 is a schematic view of a display of an electronic display displaying annotations of a webpage or a software product according to one embodiment of the present disclosure.

In one or more embodiments, instructions stored in the memory 202 of the electronic devices 200 and/or transmitted from the server 400 to the electronic devices 200, when executed by the processors 201 of the electronic devices 200, causes the displays 203 of the electronic devices 200 to display a page or section of a software product in a first iframe (i.e., a first HTML inline frame) and a user interface (e.g., a toolbar) including a message box in a second iframe adjacent to the second iframe (i.e., a second HTML inline frame). In one or more embodiments, the user interface may be displayed on the displays 203 of the electronic devices 200 that are being operated by two or more users who are affiliated with the same organization or two or more affiliated organizations and who are also viewing the same page or section of the software product. FIG. 2 depicts an exemplary embodiment of a display 203 of an electronic device 200 displaying a first window or iframe 501 displaying a viewport of a page or section of a software product (i.e., the user's visible area of the page or section of the software product), and a second window or iframe 502 adjacent or next to the first window 501 displaying a user interface (e.g., a sidebar) including a list of users 503 and a message box 504. As described in more detail below, the first window 501 of the user interface is configured to display a page of a webpage or a software product, and enable a user to annotate the content of the webpage or the software product. The annotated content of the webpage or software product, which was entered by the user of one electronic device 200, may then be viewed by the user of another electronic device 200. In this manner, the users of the electronic devices 200 may collaborate regarding the content of the webpage or software product.

In one or more embodiments, the memory 202 of the electronic device 200 operated by a first user includes instructions which, when executed by the processor 201, cause the electronic device 200 to display various tools to enable the first user to select the content of the webpage or software product, which is displayed on the display 203 of the electronic device 200, to be annotated. In one or more embodiments, these tools may include one or more icons and/or a drop-down menu instantiated within a user interface. Access to these tools may be provided according to inputs received from the I/O devices 205 of the one or more electronic devices 200 connected to the one or more servers 400 via the data network 300. For instance, in one or more embodiments, a user may highlight, using a mouse or trackpad on an electronic device, a selection of text that the user wants to provide an annotation for, and then the user may select an icon or an option from a drop-down menu to input the highlighted text as the text that the user desires to annotate.

In one or more embodiments, the memory 202 of the electronic device 200 operated by a first user includes instructions which, when executed by the processor 201, cause the electronic device 200 to display various tools to enable the first user to annotate the content of the webpage or software product displayed on the display 203 of the electronic device 200. In one or more embodiments, these tools may include one or more icons and/or a drop-down menu instantiated within a user interface. These tools may include one or more icons which, when selected by the user, enable the user to annotate the content of the webpage or the software product with text, highlighting, and/or graphical elements (e.g., lines, arrows, circles, stars, squares, etc.). FIG. 2 depicts a toolbox of icons 505 configured to enable the user to variously annotate the content displayed in the first window 501 (e.g., a draw icon configured to enable a user to draw on the webpage or software product, a text insertion icon configured to enable a user to insert text on the webpage or software product, and a highlight icon configured to enable a user to highlight text or other portions on the webpage or software product).

In one or more embodiments, the memory 202 of the electronic device 200 operated by a first user includes instructions which, when executed by the processor 201, cause the processor 201 to uniquely identify the content on the webpage or software product that was annotated. In one or more embodiments, the content that is annotated may be uniquely identified by mapping the annotated content to the associated DOM element(s) in the internal representation of the webpage or software product (e.g., identifying the "locus" of the annotated content in the DOM tree of the webpage or software product). In one or more embodiments, the content that is annotated may be uniquely identified by determining the relative position of the annotated content (e.g., the position of the annotated content within the user's current viewing window relative to the position of "container" or other fixed elements). For instance, in one or more embodiments, when the instructions are executed by the processor 201, the processor 201 may determine the position of the annotated content, expressed in a series of relative distances (percentages of the display area, or pixel widths/heights, in x- and y-coordinates), relative to fixed elements (such as "container" elements) along projected horizontal and vertical lines extending from the annotated content on the webpage or software product. In one or more embodiments, the annotated content may be uniquely identified using other metadata, such as a word count of the annotated text and a time stamp at which the annotation was created. In one or more embodiments, when the instructions are executed by the processor 201, the processor 201 may make a copy, or screen capture, of the annotated content (i.e., the processor may generate a static image of the annotated content). FIG. 2 depicts various annotations of the content displayed in the first iframe 501, including a circular annotation 506 around text appearing on the webpage or software product displayed in the first iframe 501 and a text annotation 507 including a comment to another user. As described in more detail below, uniquely identifying the location of the annotated content on the webpage or software product enables the accurate recreation of the annotated content when the webpage or software page is rendered differently, such as when the same user or a different user views the webpage or the software product on a different electronic device with a different resolution, when the height and/or width of the display window (e.g., the first iframe 501 in FIG. 2) is changed such that the content renders differently due to, for example, the browser or CSS rendering instructions, and/or when content of the webpage or software product is added, removed, or otherwise modified (e.g., rearranged).

In one or more embodiments, the memory 202 of the electronic device 200 operated by a first user includes instructions which, when executed by the processor 201, cause the processor 201 to associate the annotation(s) with the metadata that identifies the unique location of the annotated content (e.g., associate the annotation(s) with the DOM element(s) and/or the distances of the annotated content relative to fixed elements in the webpage or software product).

In one or more embodiments, the memory 202 of the electronic device 200 operated by a first user includes instructions which, when executed by the processor 201, cause the electronic device 200 operated by the first user to send a request, via the network adapter 204, to the one or more servers 400 connected via the data network 300, a request to store the annotation(s) and the metadata associated with the annotated content. In one or more embodiments, the electronic device 200 may be configured to send the request when a user selects an option via a menu instantiated in the GUI. The request may be interpreted by the API of the one or more servers 400 and the processor of the one or more servers 400 may execute instructions stored within the memory 403 of the one or more servers 400 that cause the processor 402 to, when executing the instructions, carry out the operations of receiving and storing the annotation(s) and associated metadata.

In one or more embodiments, the memory 202 of the electronic device 200 includes instructions which, when executed by the processor 201, cause the electronic device 200 to determine if changes have been made to the content of the webpage or software product after the content was annotated (i.e., determine if the content of the webpage or software product has changed relative to the content that appeared when the webpage or software product was annotated). The determination of whether the content changed may be performed by the same electronic device 200 that was utilized to annotate the content (at a time subsequent to when the annotation(s) were performed), by another electronic device 200, or by one of the one or more servers 400. In one or more embodiments, the determination of whether the content of the webpage has changed, relative to the content that appeared when the webpage was annotated, may be performed at a time when the annotated webpage or software product is subsequently viewed (e.g., by the same user at a later time or by another user utilizing another electronic device), or at a time immediately prior to the time when the annotated webpage or software product is subsequently viewed. In one or more embodiments, the memory 202 of the electronic device 200 may include any suitable algorithm or algorithms for determining if the annotated content has changed, such as, for example, a string matching algorithm, a fuzzy search algorithm, and/or an image matching algorithm (e.g., the system 100 may utilize the annotated content as a seed and then search the updated webpage, using any suitable algorithm, for the annotated content).

In one or more embodiments, the memory 202 of the electronic device 200 includes instructions which, when executed by the processor 201, cause the electronic device 200 to determine if any changes to the annotated content are so significant such that the annotation(s) cannot be accurately reproduced on the updated content of the webpage or software product. In some instances, a webpage may have significant changes made to the annotated content between instances when the content is viewed by the one or more users. These changes may, in some instances, dramatically or significantly enough change the position or display of the annotated content such that the saved annotation can no longer be displayed in a manner similar to the display at the time the annotation was created. For example, if the annotated content has been revised to include additional paragraphs or substantial edits within its written content. In some instances, the previously selected content may be so significantly changed, or entirely removed, such that display of the annotation alongside the selected content is no longer possible. For example, if the selected content has been removed from the webpage's DOM. In one or more embodiments, the memory 202 of the electronic device 200 includes instructions which, when executed by the processor 201, cause the electronic device 200 to determine if any changes to the annotated content are so significant such that the annotation(s) cannot be accurately reproduced on the updated content of the webpage or software product. In one or more embodiments, the system 100 is configured to determine that the changes to the content are too significant to adequately reproduce the annotation(s) when the algorithm (e.g., a string matching algorithm, a fuzzy search algorithm, and/or an image matching algorithm) does not return any matches within the content of the webpage or the software product. In one or more embodiments, the system 100 is configured to determine that no changes occurred (or that the changes are not too significant) when the algorithm (e.g., a string matching algorithm, a fuzzy search algorithm, and/or an image matching algorithm) returns one or more matches within the content of the webpage or the software product.

In one or more embodiments, when the annotated content has not changed (or the changes to the annotated content are not too significant), the memory 202 of the electronic device 200 includes instructions which, when executed by the processor 201, cause the electronic device 200 to display, on the display 203 of the electronic device 200, the current version of the content of the webpage or software product and the one or more annotations of the content. In one or more embodiments, the system 100 is configured to identify the annotated content (i.e., the content of the webpage that includes one or more annotations) within the updated webpage, or the closest content within the updated webpage to the annotated content, utilizing the same algorithm that was utilized to determine if the content changed (e.g., a string matching algorithm, a fuzzy search algorithm, and/or an image matching algorithm). The electronic device 200 is configured to position the annotation(s) based on the association between the one or more annotations and the metadata of the webpage or software product. For instance, in one or more embodiments, the electronic device 200 is configured to position the annotation(s) based on the DOM element(s) of the annotated content in the DOM tree of the webpage or software product (e.g., position the one or more annotations based on the "locus" of the annotated content in the DOM tree of the webpage or software product). In one or more embodiments, the electronic device 200 is configured to position the annotation(s) based on the position of the annotated content relative to the position of fixed elements (e.g., one or more "containers") of the webpage or software production. For instance, in one or more embodiments, the electronic device 200 is configured to position the annotation(s) based on the relative distances (percentages of the display area, or pixel widths/heights, in x- and y-coordinates) between the annotation(s) and fixed elements (such as "container" elements) along projected horizontal and vertical lines extending from the annotated content on the webpage or software product. In this manner, the system 100 is configured to accurately position and display the annotated content when the webpage or software page is rendered differently, such as when the same user or a different user views the webpage or the software product on a different electronic device with a different resolution, when the height and/or width of the display window is different (or is resized) such that the content renders differently due to, for example, the browser or CSS rendering instructions, and/or when content of the webpage or software product is added, removed, or otherwise modified (e.g., rearranged).

In one or more embodiments, when the annotated content has significantly changed such that the annotated content cannot be accurately reproduced, the memory 202 of the electronic device 200 includes instructions which, when executed by the processor 201, cause the electronic device 200 to signal an alert. In one or more embodiments, the alert may include a graphic displayed on the display 203 of the electronic device 200 or an auditory signal (e.g., a chime) played by the electronic device 200. In one or more embodiments, when the annotated content has significantly changed such that the annotated content cannot be accurately reproduced, the memory 202 of the electronic device 200 includes instructions which, when executed by the processor 201, cause the electronic device 200 to display, on the display 203 of the electronic device 200, a static image (e.g., a screenshot) of the annotated content as it appeared when it was annotated. That is, in one or more embodiments, the system 100 may present a user, via the GUI instantiated on the requesting user's electronic device 200, a reproduction of the screen capture saved as metadata of the annotation as it was originally presented within the webpage. This may allow the one or more users to view the annotation as it was previously stored despite the changes made to the selected content or the removal of the originally selected content from the webpage's DOM.

Figure 3:
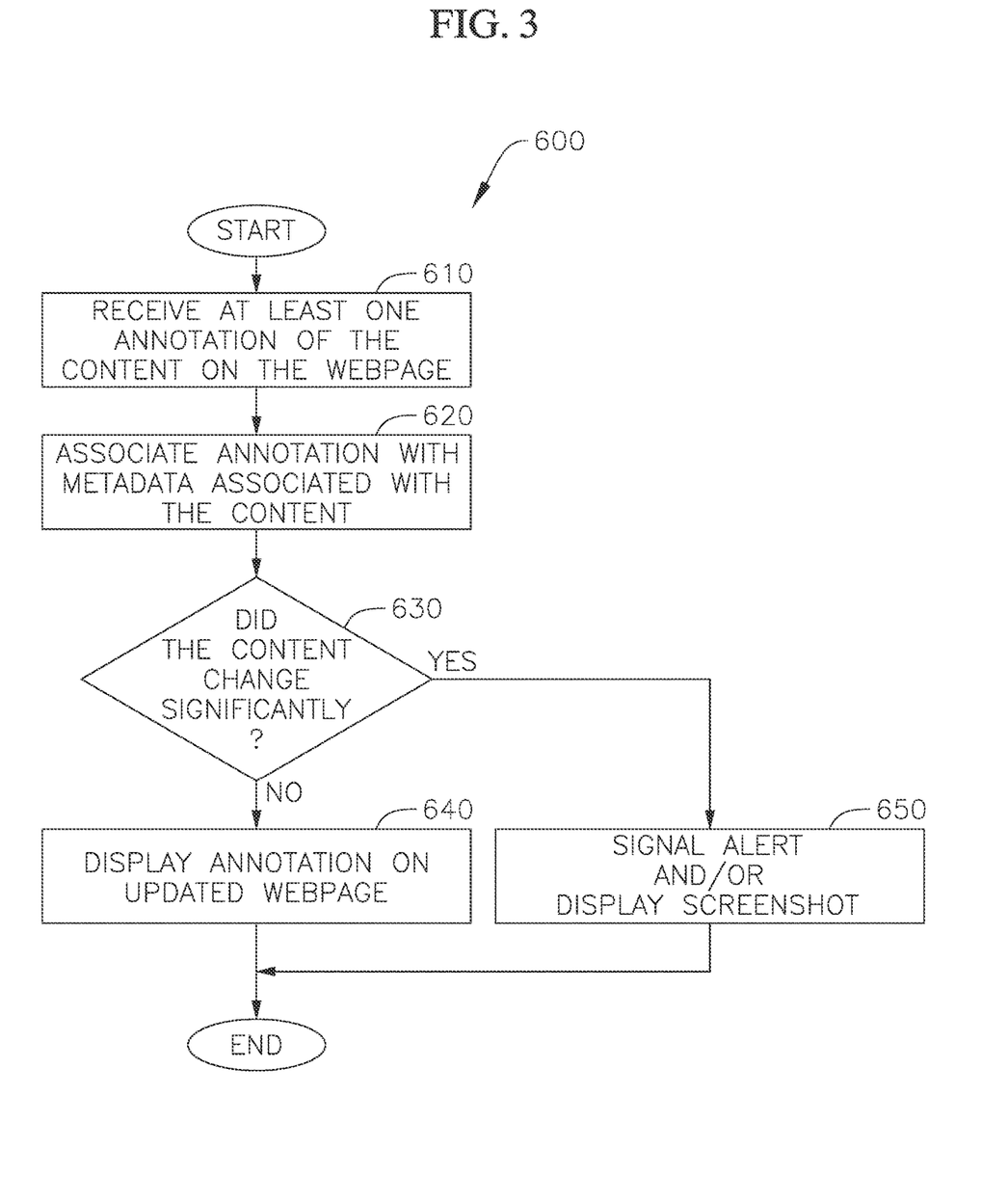
FIG. 3 is a flowchart illustrating tasks of a method of annotating a webpage according to one embodiment of the present disclosure.

FIG. 3 is a flowchart illustrating tasks of a computer-implemented method 600 of receiving annotated content on a webpage according to one embodiment of the present disclosure. In the illustrated embodiment, the method 600 includes a task 610 of receiving, from an electronic device operated by a first user, at least one annotation (e.g., highlighting, text comments, drawings, etc.) of the content on the webpage. In one or more embodiments, the one or more annotations may be input by a user utilizing an I/O device of the electronic device (e.g., a mouse, keyboard, a touchscreen, and/or stylus). The annotations may be text, highlighting, and/or graphical elements (e.g., circle(s), arrow(s), and/or drawing(s)). In one or more embodiments, task 610 may be performed by a user interfacing with a GUI (e.g., drop-down menus or other menus instantiated within the GUI of the present disclosure). Access to these operations may be provided according to inputs received from the I/O devices of the one or more electronic devices connected to the one or more servers via the data network. For example, a user may highlight, using a mouse or trackpad on an electronic device, a selection of text that the user wants to provide an annotation for. After a selection of text is made, a user may access a menu within the GUI to select an option that allows for the annotation of the selected content (e.g., the user may select a pen or pencil icon to draw an annotation, and/or the user may select a text box icon to enter a text-based annotation). The user may then enter and save an annotation using an I/O device such as a keyboard or touchscreen on a connected electronic device such as a laptop computer or mobile device such as a smart phone.

In the illustrated embodiment, the method 600 also includes a task 620 of associating the annotation with metadata associated with the content on the webpage (e.g., the task 620 includes associating metadata of the selected content with the annotation(s) of the selected content). In one or more embodiments, this metadata may include, but is not limited to: the position of the selected content within the webpage's DOM; the relative position, in pixel widths or percentages of the display area, of the selected content and annotation within the user's current viewing window of the annotation relative to the position of other fixed or "container" elements within the webpage's DOM; a copy, or screen capture, of the display of the selected content and annotation; and, other metadata relating to the content of the selected content and annotation such as word count and time stamps, etc. In some embodiments, when a user selects, via a menu instantiated in the GUI, the option to provide an annotation for selected content published online, the user device may send a request to the one or more servers connected via the data network, a request to store the annotation and metadata associated with the selected content and display of the annotation. The request may be interpreted by the API of the one or more servers and the processor of the one or more servers may execute instructions stored within the memory of the one or more servers that cause the processor to, when executing the instructions, carry out the operations of receiving and storing the annotations and associated metadata.

In the illustrated embodiment, the method 600 also includes a task 630 of determining if changes have been made to the content of the webpage that was annotated in task 610. In one or more embodiments, the task 630 may be performed at any time after the content was annotated in task 610. For instance, in one or more embodiments, the task 630 of determining if the content of the webpage has changed, relative to the content that appeared when the webpage was annotated in task 610, may be performed at a time when the annotated webpage is subsequently viewed (e.g., by another user utilizing another electronic device), or at a time immediately prior to the time when the annotated webpage is subsequently viewed. In one or more embodiments, the task 630 may utilize any suitable algorithm or algorithms for determining if the annotated content has changed, such as, for example, a string matching algorithm, a fuzzy search algorithm, and/or an image matching algorithm (e.g., the task 630 may utilize the annotated content as a seed and then search the updated webpage, using any suitable algorithm, for the annotated content). In some instances, a webpage may have significant changes made to the previously selected content between instances when the selected content is viewed by the one or more users. These changes may, in some instances, dramatically or significantly enough change the position or display of the selected content such that the saved annotation can no longer be displayed in a manner similar to the display at the time the annotation was created. For example, if the selected content has been revised to include additional paragraphs or substantial edits within its written content. In such an event, in some embodiments, the system and method of the present disclosure may enable the use of a fuzzy search to identify the modified content within the modified DOM of the webpage to facilitate finding a location to display the associated annotation that most closely reproduces the display at the time the annotation was created. Any suitable fuzzy searching algorithm, as would be known to one skilled in the art, may be used within the scope of the present disclosure to facilitate this operation. Accordingly, in one or more embodiments, the task 630 may include determining that the content of the webpage has not change, or that the content of the webpage has changed but that the changes are not so significant that the positioning of the annotation(s) cannot be suitably reproduced. In one or more embodiments, the task 630 determines that no changes occurred (or that the changes are not too significant) when the algorithm (e.g., a string matching algorithm, a fuzzy search algorithm, and/or an image matching algorithm) returns one or more matches within the content of the webpage or the software product.

In some instances, the previously selected content may be so significantly changed, or entirely removed, such that display of the annotation alongside the selected content is no longer possible. For example, if the selected content has been removed from the webpage's DOM. In such an event, in some embodiments, the system and corresponding method of the present disclosure may allow for a requesting user to be presented, via the GUI instantiated on the requesting user's electronic device, a reproduction of the screen capture saved as metadata of the annotation as it was originally presented within the webpage. This may allow the one or more user to view the annotation as it was previously stored despite the changes made to the selected content or the removal of the originally selected content from the webpage's DOM. Accordingly, in one or more embodiments, the task 630 may include determining that the content of the webpage has significantly changed such that the positioning of the annotation(s) cannot be suitably reproduced. In one or more embodiments, the task 630 determines that the changes to the content are too significant to adequately reproduce the annotation(s) when the algorithm (e.g., a string matching algorithm, a fuzzy search algorithm, and/or an image matching algorithm) does not return any matches within the content of the webpage or the software product.

In the illustrated embodiment, the method 600 also includes a task 640 of displaying, on the display of a second electronic device operated by a second user remote from the first electronic device, the annotated content of the webpage if the content of the webpage has not been changed or the content of the webpage has changed but that the changes are not so significant that the positioning of the annotation(s) cannot be suitably reproduced, as determined in task 630. After the successful creation and storage of an annotation by a user, the annotation may, in some embodiments, be made available to other users viewing the same webpage. Or, the annotation may be provided to the creating user at a later time. This may, in some embodiments, be accomplished by having an electronic device operated by the one or more users send a request via the API of the one or more servers connected via the data network to request the annotation and associated metadata. In some embodiments, this request may be made automatically by a user's web browser when the system of the present disclosure is instantiated as an extension of the associated web browser. After receipt of the request by the one or more servers, the API may return the saved annotation and associated metadata to the requesting user device. The requesting device may then interpret the received data, according to instructions stored on the memory of the device and executed by a processor of the device, to reproduce the annotation in relation to the selected content in a manner that as nearly as possible reproduces the location and display of the annotation as was displayed to the creating user. This may be accomplished by comparing the metadata associated with the display of the saved annotation and adjusting the display of the annotation on the requesting device to resize or re-position the annotation according to the display size available on the requesting device. In one or more embodiments, the task 630 is configured to identify the annotated content (i.e., the content of the webpage that includes one or more annotations) within the updated webpage, or the closest content within the updated webpage to the annotated content, utilizing the same algorithm that was utilized to determine if the content changed (e.g., a string matching algorithm, a fuzzy search algorithm, and/or an image matching algorithm). In task 630, the annotation(s) are positioned based on the association between the one or more annotations and the metadata of the webpage or software product. For instance, in one or more embodiments, the task 630 includes positioning the annotation(s) based on the DOM element(s) of the annotated content in the DOM tree of the webpage or software product (e.g., position the one or more annotations based on the "locus" of the annotated content in the DOM tree of the webpage or software product). In one or more embodiments, the task 630 includes positioning the annotation(s) based on the position of the annotated content relative to the position of fixed elements (e.g., one or more "containers") of the webpage or software production. For instance, in one or more embodiments, the task 630 includes positioning the annotation(s) based on the relative distances (percentages of the display area, or pixel widths/heights, in x- and y-coordinates) between the annotation(s) and fixed elements (such as "container" elements) along projected horizontal and vertical lines extending from the annotated content on the webpage or software product. In this manner, the method 600 is configured to accurately display the annotated content when the webpage or software page is rendered differently, such as when the same user or a different user views the webpage or the software product on a different electronic device with a different resolution, when the height and/or width of the display window such that the content renders differently due to, for example, the browser or CSS rendering instructions, and/or when content of the webpage or software product is added, removed, or otherwise modified (e.g., rearranged).

In the illustrated embodiment, the method 600 also includes a task 650 of signaling an alert (e.g., displaying a visual alert and/or playing an auditory alert) when the content of the webpage has significantly changed such that the positioning of the annotation(s) cannot be suitably reproduced, as determined in task 630. In one or more embodiments, when the content of the webpage has significantly changed, the task 650 may include displaying an archived (cached) copy of the webpage as it appeared when the annotation was entered in task 610 and the annotation(s) on the annotated content instead of, or in addition to, signaling the alert.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described systems and methods of operation can be practiced without meaningfully departing from the principles, spirit, and scope of this invention, as set forth in the following claims, and equivalents thereof.

What is claimed is:

1. A computer-implemented method of annotating a webpage or a software product, the method comprising:
   receiving, from a first electronic device, an annotation of content on the webpage or the software product displayed on a display of the first electronic device;
   uniquely identifying the content by identifying a locus of the content in a Document Object Model (DOM) tree in an internal representation of the webpage or the software product;
   associating the annotation with the locus of the content in the DOM tree;
   determining changes to the content of the webpage or the software product after associating the annotation with the locus of the content in the DOM tree;
   determining the changes permit accurate reproduction of the annotation on the content;
   transmitting a signal from the first electronic device to a second electronic device remote from the first electronic device; and
   in response to receipt of the signal by the second electronic device, displaying, on a display of the second electronic device, the annotation and the content of the webpage or the software product based on the association between the annotation and the locus of the content in the DOM tree of the webpage or the software product,
   wherein the content of the webpage or the software product is rendered differently on the second electronic device than on the first electronic device, and
   wherein the annotation is accurately located on the content due to the association between the annotation and the locus of the content in the DOM tree of the webpage or the software product.

2. The method of claim 1, wherein the determining of the changes to the content comprises performing a search utilizing a string matching algorithm, a fuzzy search algorithm, and/or an image matching algorithm.

3. The method of claim 2, further comprising transmitting an alert to the second electronic device in response to the search returning no results.

4. The method of claim 2, further comprising transmitting, to the second electronic device, a screenshot of the annotation and the content in response to the search returning no results.

5. The method of claim 1, wherein the content is selected from the group consisting of text, graphical elements, and combinations thereof, and wherein the annotation is selected from the group consisting of highlighting, text, graphical elements, and combinations thereof.

6. The method of claim 1, wherein the uniquely identifying the content further comprises determining a position of the content relative to a position of at least one fixed element in the internal representation of the webpage or the software product and along a projected horizontal line and/or a projected vertical line from the content.

7. The method of claim 6, wherein the position of the content comprises a series of relative distances expressed in percentages of a display area of the display and/or pixel widths and heights.

8. The method of claim 1, further comprising receiving, from the first electronic device, a selection of the content on the webpage or the software product.

9. A non-transitory computer-readable storage medium having software instructions stored therein, which, when executed by a processor, cause the processor to:
- receive, from a first electronic device, an annotation of content on a webpage or a software product displayed on a display of the first electronic device;
- uniquely identify the content by identifying a locus of the content in a Document Object Model (DOM) tree in an internal representation of the webpage or the software product;
- associate the annotation with the locus of the content in the DOM tree;
- determine changes to the content of the webpage or the software product after associating the annotation with the locus of the content in the DOM tree;
- determine the changes permit accurate reproduction of the annotation on the content; and
- transmit a signal configured to display, on a display of a second electronic device, the annotation and the content of the webpage or the software product, wherein the content of the webpage or the software product is rendered differently on the second electronic device than on the first electronic device and wherein the annotation is accurately located on the content due to the association between the annotation and the locus of the content in the DOM tree of the webpage or the software product.

10. The non-transitory computer-readable storage medium of claim 9, wherein the instructions, when executed by the processor, cause the processor to perform a search utilizing a string matching algorithm, a fuzzy search algorithm, and/or an image matching algorithm to determine the changes to the content.

11. The non-transitory computer-readable storage medium of claim 10, wherein the instructions, when executed by the processor, further cause the processor to transmit an alert to the second electronic device in response to the search returning no results.

12. The non-transitory computer-readable storage medium of claim 10, wherein the instructions, when executed by the processor, further cause the processor to transmit, to the second electronic device, a screenshot of the annotation and the content in response to the search returning no results.

13. The non-transitory computer-readable storage medium of claim 9, wherein the content is selected from the group consisting of text, graphical elements, and combinations thereof, and wherein the annotation is selected from the group consisting of highlighting, text, graphical elements, and combinations thereof.

14. The non-transitory computer-readable storage medium of claim 9, wherein the instructions, when executed by the processor, further cause the processor to determine a position of the content relative to a position of at least one fixed element in the internal representation of the webpage and along a projected horizontal line and/or a projected vertical line from the content to uniquely identify the content.

15. The non-transitory computer-readable storage medium of claim 14, wherein the position of the content comprises a series of relative distances expressed in percentages of a display area of the display and/or pixel widths and heights.

16. The non-transitory computer-readable storage medium of claim 9, wherein the instructions, when executed by the processor, further cause the processor to receive, from the first electronic device, a selection of the content on the webpage or the software product.

* * * * *